April 2, 1946.  C. T. O'CONNOR  2,397,618
PACKING MATERIAL
Filed Oct. 19, 1943

CONOR T. O'CONNOR
INVENTOR

BY John P. NiRonow
ATTORNEY

Patented Apr. 2, 1946

2,397,618

UNITED STATES PATENT OFFICE 2,397,618

PACKING MATERIAL

Conor T. O'Connor, Trinidad, British West Indies

Application October 19, 1943, Serial No. 506,818

3 Claims. (Cl. 288—16)

My invention relates to packing materials and has particular reference to packing and packing products used in engines, turbines, compressors, pumps, etc.

I have found that loofah, which is a tropical cucurbitaceous plant, furnishes a very good material for the preparation of engine and pump packing. This plant produces an ovate or oblong fruit whose inner portion consists of a strong fibrous spongy structure. The latter, when dried and cleaned from the outer shell and seeds inside, can be used for making packing material. According to my invention, the spongy loofah, when treated with oil and graphite, becomes pliable and, when moulded under pressure, forms a hard and somewhat resilient material which can be used for packing glands in engines, pumps and the like.

My invention is more fully described in the accompanying specification and drawing in which.

Figure 1:
Fig. 1 is a side view of a piece of loofah after preliminary treatment.

The loofah fruit, according to my invention, is first dried and cleaned from the outer shell, seeds and other vegetable matter, not forming part of the inner fibrous structure. The remaining core is preferably roughly trimmed into a desired shape such as a ring 1, Fig. 1. The trimmed pieces are placed in a vat with a mixture of a mineral oil and powdered or flaked graphite. The loofah blocks are left in the vat until thoroughly soaked with oil and to obtain more thorough penetration, may be agitated and kneaded to drive all the air from the spaces between fibers. The oil may be heated to facilitate its penetration into the loofah cores. Heavy grease can be also used for certain purposes, the grease being heated and melted.

Figure 2:
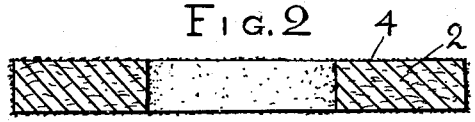
Fig. 2 is a similar view of a finished product.
Figure 3:
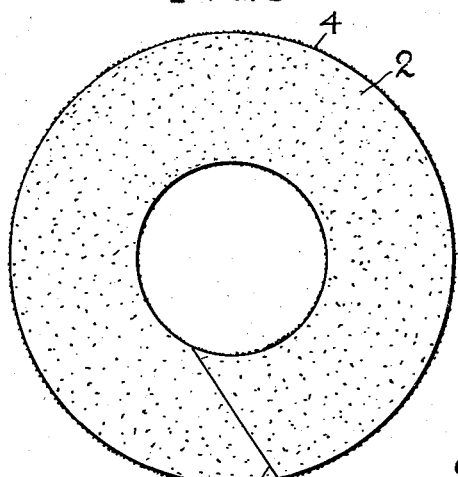
Fig. 3 is a plan view of the same.

Upon removal from the vat the cores, while still hot, are placed in moulds and subjected to an increased pressure for reducing spaces between the fibers and for making the blocks homogeneous and relatively hard. The pressure varies according to the shape and size of the pieces but should not be too great as the product must retain certain pliability and resiliency. The resultant pieces, such as rings 2, Fig. 2, can be used for packing glands in steam engines, compressors, pumps, etc. and possess very good wearing properties, lasting in service even longer than some of the ordinary packing materials. Moreover, the loofah packing rings can be compressed more tightly than asbestos packing without danger of scoring piston rods and other moving parts sealed by the packing. The ring may be split at 5 to facilitate its fitting on a shaft, piston rod, etc.

Figure 4:
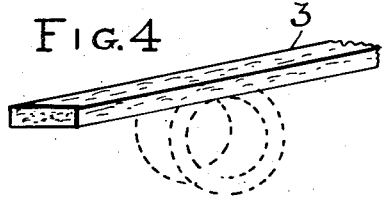
Fig. 4 is a perspective view of a packing rod.

The loofah cores can be also cut into thin longitudinal strips and twisted into long ropes. The latter are soaked in graphitized oil and passed through a die to obtain long rods or bars 3, Fig. 4. Pieces of such rods can be wrapped around the piston rods in glands to serve as a packing, or the rods can be twisted into spirals to be cut into desired lengths as required for ordinary glands. Dry graphite flakes can be sprinkled or spread over the surface of the product to improve its lubricating properties. Such a layer 4 of dry graphite also forms a protective covering against dust or dirt which may otherwise gather on the oily surface of the packing.

Figure 5:
Fig. 5 is a fractional perspective view of a board made of loofah.

For making boards 6, Fig. 5, the loofah cores are shredded into small pieces and mixed with a suitable binder such as asphalt and tar, plaster of Paris, cement, etc. The loofah shreds or fibers can be also mixed with other fibers such as wood pulp, asbestos, shredded corn stalks, etc. The resultant mass is compressed into plates or boards 6.

The blocks of my packing can be also cut into smaller pieces for fitting packing glands where such a procedure is possible. Because of their resiliency and pliability, the pieces can completely fill the glands, forming a good steamproof packing.

The loofah cores, after treatment with oil and graphite, can be also used in their natural shape for filling large packing glands, such, for instance, as are used in the oil industry, for large engines, etc.

It is understood that my packing materials may be further modified without departing from the spirit of the invention, as set forth in the appended claims.

I claim as my invention:

1. A packing material comprising a piece of a cleaned fibrous porous core of a loofah fruit having its pores filled with a mixture of an organic binder with graphite.

2. A packing material comprising a dried porous loofah core in the shape of a block having its pores filled with a mixture of a lubricating material as a binder and graphite in its pores.

3. A packing material comprising a dried porous loofah core having its pores filled with a binder for holding the core in a desired shape.

CONOR T. O'CONNOR.